US007327382B2

(12) United States Patent
Rodriguez et al.

(10) Patent No.: US 7,327,382 B2
(45) Date of Patent: Feb. 5, 2008

(54) SYSTEM AND METHOD FOR PROCESSING ELECTRONICALLY CAPTURED IMAGES TO EMULATE FILM TONESCALE AND COLOR

(75) Inventors: Nestor M. Rodriguez, Rochester, NY (US); David Long, Rochester, NY (US); Karleen M. Cirulli, Webster, NY (US); John C. Brewer, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 516 days.

(21) Appl. No.: 11/068,632

(22) Filed: Feb. 28, 2005

(65) Prior Publication Data

US 2005/0179775 A1 Aug. 18, 2005

Related U.S. Application Data

(63) Continuation of application No. 09/712,500, filed on Nov. 14, 2000, now Pat. No. 7,034,862.

(51) Int. Cl.
*H04N 9/47* (2006.01)
*H04N 9/64* (2006.01)

(52) U.S. Cl. ......................... 348/96; 348/577; 358/518

(58) Field of Classification Search ................ 348/576, 348/655, 104, 97, 96, 577, 578; 375/240.01; 382/166; 386/128
See application file for complete search history.

(56) References Cited

U.S. PATENT DOCUMENTS 4,771,342 A * 9/1988 Beesley ...................... 386/114
5,140,414 A 8/1992 Mowry ........................ 358/81
5,189,511 A 2/1993 Parulski et al. ............... 358/80
5,319,465 A 6/1994 Squyres et al. ............. 358/310
5,335,013 A 8/1994 Faber ......................... 348/104
5,374,954 A 12/1994 Mowry ....................... 348/121
5,406,326 A 4/1995 Mowry ....................... 348/104
5,457,491 A 10/1995 Mowry ....................... 348/104
5,475,425 A 12/1995 Przyborsi et al. ........... 348/239
5,641,596 A 6/1997 Gray et al. ................... 430/21
5,644,674 A 7/1997 Aihara et al. ................. 386/52
5,646,750 A * 7/1997 Collier ....................... 358/518
5,687,011 A 11/1997 Mowry ....................... 358/527
5,729,363 A 3/1998 Aihara et al. ............... 358/906
5,831,673 A 11/1998 Przyborski et al. ......... 348/239
5,859,951 A 1/1999 Aihara et al. ............... 386/107
6,987,586 B2 * 1/2006 Bogdanowicz et al. ...... 358/1.9

* cited by examiner

*Primary Examiner*—Gims Philippe
*Assistant Examiner*—Erick Rekstad
(74) *Attorney, Agent, or Firm*—Stephen H. Shaw; Peyton C. Watkins

(57) ABSTRACT

A method for converting a sequence of electronically captured images into a sequence of modified images for providing the appearance of images captured by a film reproduction system. The film reproduction system being includes motion picture negative film printed onto a motion picture print film that is displayed, or a reversal motion picture system in which the reversal film is displayed, or a motion picture film electro-optically scanned to standard format video by a telecine and further displayed, or a motion picture film electro-optically scanned by a scanner suitable for producing digital data intended for additional digital image manipulation. A digital master is prepared from the aforementioned film formats for electronic distribution or recording out to another film to be used as a printing master for producing distribution optical prints for theatrical projection.

5 Claims, 5 Drawing Sheets

SCENE 1, SET-UP A 10
SCENE 2, SET-UP A 11
SCENE 3, SET-UP A 12
14
15 EXPOSURE LINEARIZATION STAGE
16 LUT
17 EXPOSURE COLOR MATRIX STAGE
18 MATRIX
19 SCANNER DENSITY LUT STAGE
20 LUT
21 SCANNER DENSITY COLOR MATRIX STAGE
22 MATRIX
23 DIGITAL COLOR BALANCE STAGE
25 FILM RECORDER
27 FILM PROCESSOR
30 SCENE 1
31 SCENE 2
32 SCENE 3

SYSTEM AND METHOD FOR PROCESSING ELECTRONICALLY CAPTURED IMAGES TO EMULATE FILM TONESCALE AND COLOR

CROSS-REFERENCE TO RELATED APPLICATIONS

This is a continuation of U.S. application Ser. No. 09/712,500 filed on 14 Nov. 2000 now U.S. Pat. No. 7,034,862 by Karleen M. Cirulli, John C. Brewer and Nestor M. Rodriguez, and entitled “System and Method for Processing Electronically Captured Images to Emulate Film Tonescale and Color”, wherein this prior application is incorporated by reference herein.

FIELD OF THE INVENTION

The present invention relates generally to the field of video processing or digital image processing to emulate motion picture film tonescale and color. More specifically, the invention relates to rendering an electronically captured image to emulate a film system reproduction, that is, to provide the appearance of an image captured with motion picture film.

BACKGROUND OF THE INVENTION

Images captured with a digital motion camera or a video camera often have a look described as the “soap-opera” look: relatively flat images with blown-out highlights, blocked-up shadow details and harsh flesh tones. However, electronic capture has been well accepted because of the potentially cheaper economics as compared to film capture. Also, electronically captured material is usually viewed only on a television screen, which is a far less demanding output venue than a movie theater screen. Despite the cost and output venue, however, certain attributes of the film process provide an appearance which is aesthetically pleasing and, to some extent, may influence the artistic quality of the recorded images. Thus, there has always been a market for the desire to take these images captured with the “soap-opera” look and give them the appearance of film, as if they were originated on film and put through the film system (the term “filmic” will be used to mean “appearance of film”). Filmic can be used to describe images with high dynamic range, good highlight and shadow detail, pleasing flesh tones and, in general, an overall richer image than obtained from the “soap-opera” look.

Digital image processing may take place on video images, as described in U.S. Pat. Nos. 5,335,013, 5,475,425 and 5,831,673, in order to emulate the broadcast look of film or the look of film after it has been through a telecine transfer. These patents describe systems for rendering the output of a video camera to simulate the visual appearance of motion picture film that has been transferred or converted to a video signal to be output directly for television broadcasting or recording on video tape. Further, the above-cited prior art teaches three components for the emulation of the look of broadcast motion picture film. One component deals with the conversion of the video or digital material into various video formats from either 30 frames per second (fps) or 24 fps origination rate. The second component allows for the selective addition of filtered noise to the electronically captured images to give the appearance of motion picture film grain. The third component allows for the alteration of the apparent contrast of the video image so the desired broadcast film appearance may be obtained. More specifically, in the ’013 patent a gray scale modifier is used as a look-up table (LUT) and the operator can choose between a variety of curves (% light level vs. video level) stored in programmable read-only memory (PROM) to reflect different film types or achieve different photographic effects. The desired curve is selected by pressing a switch on the hardware.

U.S. Pat. Nos. 5,140,414; 5,374,954; 5,406,326; 5,457,491 and 5,687,011 (each issued to Mowry) represent a family of related post-production video technology that seeks to arrive at an aesthetically acceptable simulation of the appearance that images originated on different motion picture film stocks would embody after telecine “flying spot scanner” transfer to video from taped high definition video originated images. One component of this prior art technology deals with the conversion of the video-originated material through a LUT that is based on color temperature of the scene lighting, scene brightness and selected f-stop setting. The conversion values in the LUT are derived by filming color charts and grey scale charts, obtaining a digital representation of the film component responses of the charts from telecine transfer of the film to videotape, and then charting the telecine-derived component responses against video originated images of the same charts under identical lighting conditions. Another component of this prior art technology allows for physically instilling selected film grain patterns to the video images. The final simulated video image is either recorded as a high definition signal, or converted to an NTSC signal and broadcast or displayed.

In the latter two of the aforementioned Mowry patents, the digitized video signal may be sent to a film recorder, which reproduces the component-modified images onto a selected, reversal film stock. The film is chemically processed with a film processor and then optically projected, or scanned to video, digital video, or other electronic media. However, if the film recording option is employed, these patents specify that it is important that the telecine-derived LUT used in the component modification involves response data which compensates for the inherent color response of the film stock on which the images are being digitally recorded.

Another prior art example of post-production digital image processing, which takes place outside the video camera or digital motion camera, exists in certain current image manipulation software packages. FIG. 1 shows a schematic diagram of one such example of this type of prior art processing, namely, histogram equalization. The histogram equalization method requires, for every frame 1 of a digital image that is to be manipulated, a scanned frame 2 of a reference film preferably with, for optimal results, the same scene content. Some resizing constraints 3 might also have to be met, depending on the software, because the digital image and the scanned film image will most likely not be the same size. Then, with these two input images, a well-known cumulative histogram equalization process 4 is performed to manipulate the electronically captured images closer to a film tonescale and color, thereby providing output manipulated images 5. This method, however, is not optimal because its inputs are of mixed formats: some form of RGB exposures from the electronically captured images versus the scanned film densities. As a result, it is impossible to optimally alter the tonescale and color of the electronically captured image to emulate scene exposure as seen by film.

Prior art also exists for generating a broadcast film appearance with video or digitally captured images, where the processing occurs inside of the camera. Specifically, setup cards have been described for beta-camcorders and also digital camcorders (see L. J. Thorpe et al, "The HDTV Camcorder and the March to Marketplace Realty", *SMPTE Journal*, March 1998, pp. 164-177). These miniature plug-in setup cards facilitate prealignment of the camera to achieve an HD image having attributes similar to those that might otherwise be created from a film origination followed by telecine transfer to HD video. The setup cards can be pre-programmed to store desired digital data settings for aesthetic choices to be made concerning, among other characteristics, color reproduction, tonal reproduction and skin-tone detail.

In a combined approach, U.S. Pat. No. 5,319,465 describes a method using modified camera production and modified post-production processes and equipment to create filmic images. Specifically, the method includes the steps of shooting a benchmark comprising a gray scale chart, a color test chart and two backfocus charts with both a film and a video camera with comparable scene lighting and depth of field. Once the film test benchmark is shot, the film is transferred to videotape utilizing a telecine apparatus, with settings indicative of an industry standard set-up film. The video camera image's hue, saturation, luminance and gamma levels are manipulated to color correct the video camera image to look visually like the transferred film image. After the videotape has been edited, the videotape undergoes color correction in which the videotape benchmark is corrected to match the film test benchmark.

The prior art is generally trying to emulate the look of film after it has been telecine-transferred to video. This is desirable to some extent because the telecine system does have some film attributes when broadcasted. However, the prior art neglects the emulation of the look of film origination, as if a negative film has been directly printed and projected through a motion picture system. This is particularly desirable where the digital output is recorded on film for projection. Where the prior art does deal with film recording, as in the latter two of the above-mentioned Mowry patents, it does so in the context of a telecine-transferred benchmark. Moreover, when the prior art alters the tone scale and color of a video or digitally captured image to emulate a film, it is done on the telecine-transferred benchmark. This is an imperfect alteration because it cannot operate upon the scene exposure as seen by a film.

What is needed is a system that correctly emulates the look of film origination, particularly as to the emulation of film tonescale and color reproduction, as if a negative film has been directly printed and projected through a motion picture system.

SUMMARY OF THE INVENTION

The present invention is directed to overcoming one or more of the problems set forth above. Briefly summarized, according to one aspect of the present invention, a sequence of electronically captured images are converted into modified images providing the appearance of images captured by a film reproduction system, where the film reproduction system is of the type that includes a motion picture negative film printed onto a motion picture print film that is displayed, or a reversal motion picture system in which the reversal film is displayed. After electronically capturing the images, the electronically captured image data is transformed into linearized exposure data, which is subsequently transformed with a linear function that emulates a film exposure of the film reproduction system. The exposure-corrected images are then transformed with a non-linear function that renders the exposure-corrected images with a tone scale of the film reproduction system, and the tonescale-corrected images are transformed with a linear function that emulates a film color look provided by the film reproduction system. In order to achieve the desired results, the transformation steps are referenced to scanned film densities of a film used in the film reproduction system.

These and other aspects, objects, features and advantages of the present invention will be more clearly understood and appreciated from a review of the following detailed description of the preferred embodiments and appended claims, and by reference to the accompanying drawings.

ADVANTAGES OF THE INVENTION

The present invention alters the tonescale and color of an electronically captured image only after it has been shifted to emulate scene exposure as seen by film. Then the shifted electronic exposures are mapped through a predetermined LUT and matrix that imparts a film tonescale and color to the electronically captured image. This method is advantageous because it allows for automation of the image processing with predetermined algorithms. In addition, it does not require color-timing decisions to be made by an operator on a per scene basis, if the video or digital camera set-ups remain constant.

The present invention method is also advantageous because it allows for automation of the image processing and does not require use of a reference frame of film on a per frame basis. A film reference is only required for each different electronic camera set-up. Once the algorithms of the present invention are created, the image rendering runs independent of any film frame references.

DETAILED DESCRIPTION OF THE INVENTION

Figure 1:
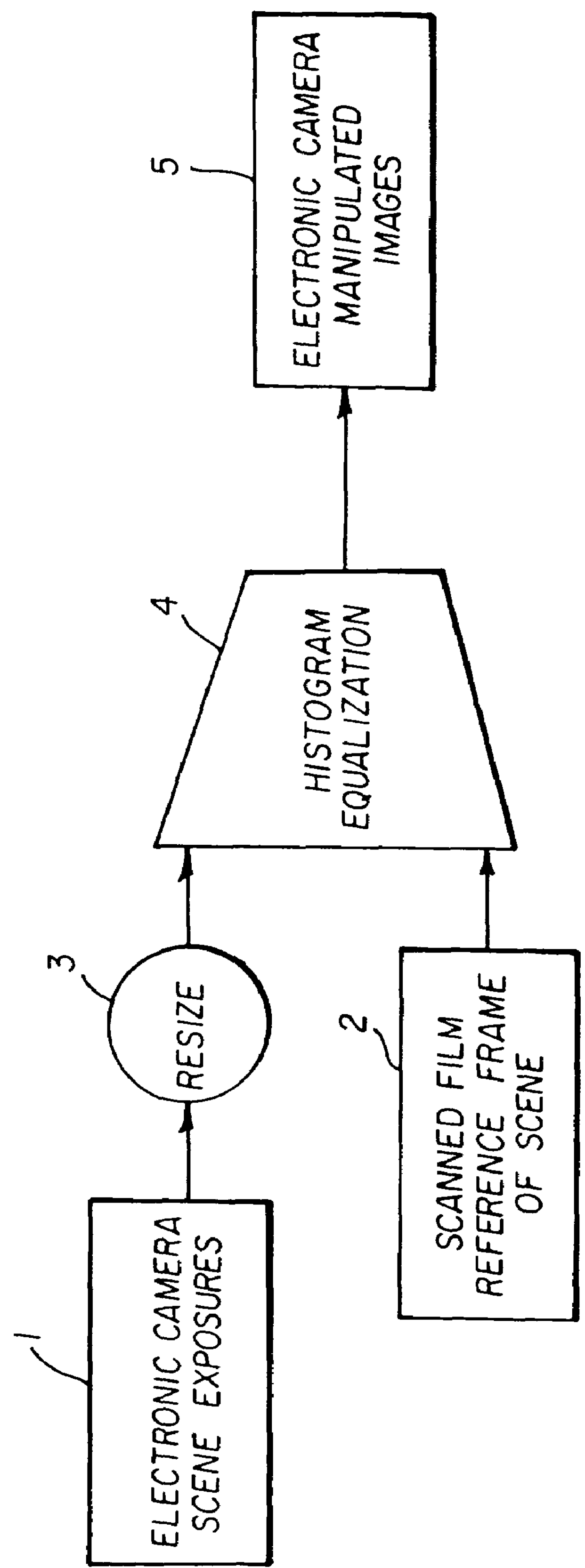
FIG. 1 is a schematic block diagram of a digital imaging process known in the prior art.

Because video or digital image processing systems that emulate the look of motion picture film, particularly after telecine conversion, are well known, the present description will be directed in particular to attributes forming part of, or cooperating more directly with, a system and a method in accordance with the present invention. Attributes not specifically shown or described herein may be selected from those known in the art. In the following description, a preferred embodiment of the present invention would ordinarily be implemented at least in part as a software program, although those skilled in the art will readily recognize that the equivalent of such software may also be constructed in hardware. Given the system as described according to the invention in the following materials, software not specifically shown, suggested or described herein that is useful for implementation of the invention is conventional and within the ordinary skill in such arts.

If the invention is implemented as a computer program, the program may be stored in conventional computer readable storage medium, which may comprise, for example; magnetic storage media such as a magnetic disk (such as a floppy disk or a hard drive) or magnetic tape; optical storage media such as an optical disc, optical tape, or machine readable bar code; solid state electronic storage devices such as random access memory (RAM), or read only memory (ROM); or any other physical device or medium employed to store a computer program.

As detailed, the present invention provides a system and method for rendering electronically captured images to emulate the appearance in tonescale and color of images captured with motion picture film, and subsequently printed onto another motion picture film and displayed theatrically (negative-positive system). The method of this invention can also apply to a reversal motion picture system; the aspects of the invention remain the same. There are two related aspects of the invention: the preliminary step of setting up the system to provide the required emulation and the subsequent operational use of the system, as thus set-up, to process the electronically captured images. The preliminary step of the present invention is to create the LUTs and matrices that linearize the electronically captured exposure data, emulate the film exposures, and generate filmic images in tonescale and color; this is done once per video or digital camera set-up. (It should be understood that video, digital and electronic camera are used interchangeably herein and are meant to include any electronic image capture device, whether motion or still, that will provide electronically captured images.) Once these LUTs and matrices are established for a particular video or digital camera set-up, they are utilized in the operational stages for all the scenes with the same set-up.

These LUTs and matrices are created using the processes shown in connection with FIGS. 3 and 4, which will be described in detail later in this specification. Briefly, photographic targets containing neutral patches of known reflectances are recorded with both an electronic camera and a motion picture camera using film. Unlike the prior art, which subjects the processed film to a telecine transfer in order to create a film benchmark, in this invention the motion picture film is scanned with a film scanner, and the scan data is thereby rendered in printing density space. The scan data from the film is then stored as a digital image and used to benchmark the film. In separate mathematical calculations, the red, green and blue exposure values of the film are computed. Both the electronic camera exposure values and the film scene exposure values can be in the same or different bit-depth formats.

Figure 2:
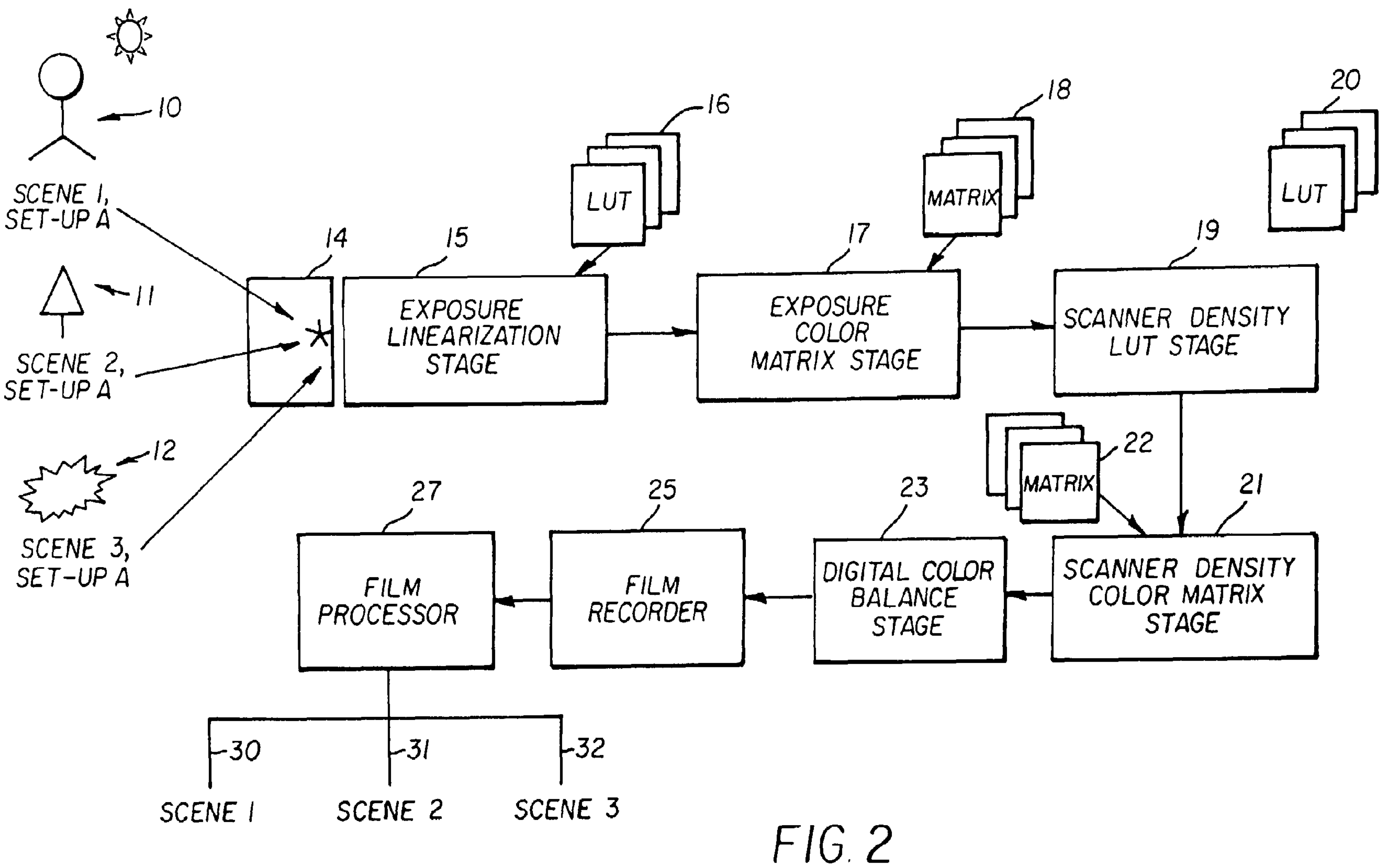
FIG. 2 is a schematic block diagram of a method and system for emulating the look of film origination according to the present invention.

FIG. 2 is a schematic block diagram of the present invention, as applied to the processing of electronically captured images. It also shows one of the advantages of the present invention in that several different scenes may be processed using the same algorithms and without a film reference. More specifically, for the purpose of illustration, three typical scenes, such as a talent close-up scene 10, a background scene 11 and an action scene 12, are all shot in a capture stage 14 with the same video camera or digital camera set-up (herein referred to as set-up A), and then image processed using the same algorithms and without a film reference. Set-up A would minimally include the camera lens, gain, gamma, color matrix, and white point, balanced for an illuminant. The images captured in the capture stage 14 by an electronic camera exist as data bits stored, e.g., on a storage medium such as D5 tape. This data is input to a software platform represented by the processing stages shown in FIG. 2, where the red, green and blue camera exposures undergo image processing. This software platform may be a part of a larger, commercially available platform, such as those commonly used in post production. As mentioned above, the descriptions related to FIGS. 3 and 4 will address the creation of the algorithms utilized according to the invention in the stages shown in FIG. 2 that are principally involved in the practice of the invention.

The initial objective is to transform the electronically captured exposures so as to emulate film scene exposures. First, as will be explained in more detail in relation to FIG. 3, the neutral patch exposures from the electronic capture are linearized to compensate for any electronic camera nonlinearities so as to emulate the neutral patch exposures of the film. This can be done with mathematics such as a lookup table (LUT), an inverse gamma function or with histogram equalization. Then, as shown in FIG. 2, all the electronically captured scene exposures are mapped through this same mathematical process in an exposure linearization stage 15, resulting in neutral- corrected electronic scene exposures.

The exposure linearization stage 15 is necessary because the exposure data from the electronic camera typically has a gamma function (which is nonlinear) applied to it to compensate for the nonlinearities of the intended display device, usually a phosphor CRT monitor. This is well known in the field as discussed in *Digital Color Management*, by E. Giorgianni and T. Madden, Addison-Wesley, 1998, pp. 64-66. Since the purpose of the present invention is to emulate projected film tone and color, this gamma function is inappropriate for this specific goal. While the linearization process may be achieved with several different mathematical methods, as alluded to above, the present invention employs a first LUT 16, in particular a one-dimensional LUT for each color record. Such a LUT can be readily obtained and accomplished by one skilled in the art. Note that a plurality of first LUTs 16 may be made available, depending on the characteristics of the various electronic cameras that might be used. Moreover, the step of transforming the electronically captured image data into linearized exposure data may be performed in the electronic camera, so that the camera directly provides the linearized exposure data without the usual gamma function.

These neutral-corrected electronic scene exposures may be modified again with a matrix operation to increase their accuracy versus the film scene exposures. This step can be optional inasmuch as the neutral-corrected electronic scene exposures may be sufficiently close to film exposures, but practice has shown that doing this matrix operation leads to improved results. Such accuracy is increased if the electronic camera system possesses spectral product curves that can be reasonably approximated as a linear combination of conventional motion picture camera and film system spectral product curves. By satisfying this condition, the invention is capable of “seeing” a scene in the same way that traditional motion picture film does, since exposure sets yielded from the electronic camera system and from the film can be well matched by a matrix operation. After this matrix is applied to the exposure signals, the resulting signals will represent film system exposure information more accurately. Accordingly, the next step (optional as explained above) in the present invention is an exposure color matrixing stage 17, which executes a first matrix 18 on the neutral-corrected electronic scene exposures that results in exposures that emulate film exposures. As will be later described in more detail, the first matrix 18 is employed analogously to the matrix operations described in U.S. Pat. No. 5,668,596, entitled "Digital Imaging Device Optimized for Color Performance". The resulting electronically captured exposures modified to emulate film scene exposures will hereby be referred to as exposure-corrected electronic scene exposures. Note that a plurality of first matrices 18 may be made available, depending on the characteristics of the various camera-film combinations that might be used.

Next, the exposure-corrected electronic scene exposures are processed through a scanner density stage 19, which executes a predetermined nonlinear mathematical function, by means of a second LUT 20, on the exposure-corrected electronic scene exposures. The purpose of the LUT 20 is to relate scene exposure to scanned film density in a manner that is independent of interlayer image effects. More specifically, nonlinear image processing is applied to the exposure-corrected electronic scene exposures in order to emulate the film tone scale densities. One skilled in the art of image processing should be familiar with such nonlinear methods. For this example, three one-dimensional LUTs (one per color record) were used in the scanner density stage 19; an alternative technique could employ a single three-dimensional LUT. However, it should be understood that a plurality of second matrices 20 may be made available, depending on the characteristics of the various films that might be used. At this point in the process shown in FIG. 2, the tonescale-corrected electronically captured exposures are rendered with the tonescale of the film, and therefore will be referred to as tonescale-corrected electronic scene values.

The tonescale-corrected electronic scene values, which may be thought of as calculated "scanned densities" of the electronically captured image that are independent of color cross talk, are mathematically transformed by one or more operations, embodied as a second matrix 22, in a scanner density color matrix stage 21. This stage transforms the tone scale-corrected electronic scene values to provide data having a film color look. More specifically, the stage 21 applies another (second) color matrixing operation, but now it is matrixing the electronic values to emulate film color. After this step, the present invention has achieved the emulation of film tone and color from electronically originated images, and the result will be referred to as color-corrected electronic scene values. Once the film color look is obtained, these color corrected electronic scene values may be sent to various outputs, such as a film recorder 25 or a digital projector (not shown). Other possible output venues include an electro-optical display, such as a television display, a liquid crystal display, a laser projector or like kinds of devices, retinal projection, or electro-optic mechanisms. There may be certain situations in which it would be desirable to transfer the processed film to video by means of a telecine apparatus.

In the preferred embodiment, however, a digital color balance stage 23 is first applied to the color-corrected electronic scene values of the electronically captured images, which serves the purpose of digitally color-balancing the images by balancing a reference neutral to a previously determined scanner density. This scanner density is recorded on film as described in a tutorial article by G. Kennel, "Digital Film Scanning and Recording: The Technology and Practice", *SMPTE Journal*, March 1994, pp. 174-181, and the recorded output film is subsequently printed to LAD (Laboratory Aim Density). The printing procedure utilizing LAD is documented in an article by Pytlak and Fleischer entitled "A Simplified Motion-Picture Laboratory Control Method for Improved Color Duplication", *SMPTE Journal Volume* 85, October 1976. This scanner density will vary greatly with the user's artistic objectives. The output resulting from the color timing stage 23 will be referred to as balanced electronic scene values.

These balanced electronic scene values are now sent, for the purpose of this embodiment, to the film recorder device 25, where image data corresponding to the balanced electronic scene values is written on film, e.g., by a known laser writing process. The film is then processed in a film processor stage 27 in accordance with Eastman Kodak's H-24 Processing Manual. For the purpose of the preferred embodiment, the video or digitally originated images from the scenes 10, 11 and 12 now exist on one or more pieces of film 30, 31, 32; importantly, each film now emulates the appearance in tonescale and color of images captured with motion picture film. The output film (that film which existed in the film recorder) is then printed onto another motion picture film, using the standard procedures as outlined in Eastman Kodak's H-1 Professional Motion Picture Films publication. The film onto which the output film was printed is subsequently processed, in accordance with Eastman Kodak's H-24 Processing Manual and displayed theatrically, just as if film had been used as the originating medium. Note that in utilizing the present invention, no film reference was needed during the operational process shown in FIG. 2 and all the algorithms for the three different scenes were the same, based on the electronic camera set-up A.

Figure 3:
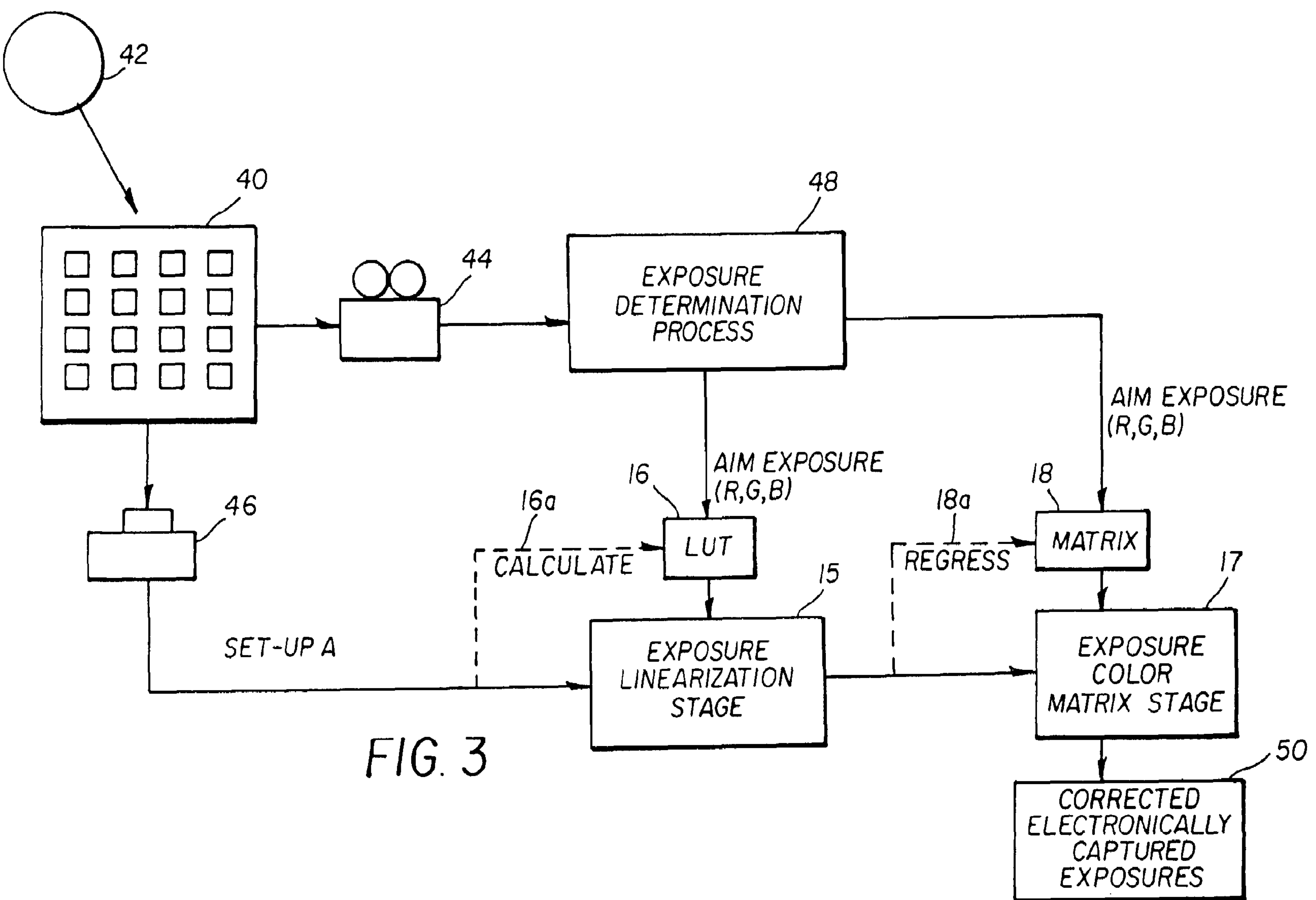
FIG. 3 is a schematic block diagram of the steps involved in creation of exposure algorithms for the present invention.

FIG. 3 shows a schematic block diagram of the steps involved in creating the exposure algorithms used in connection with FIG. 2 for practice of the present invention. This block diagram depicts the method used to determine the LUT 16 (used in the exposure linearization stage 15) and the matrix 18 (used in the exposure color matrixing stage 17) that will emulate film exposures from electronic origination. One or more color test targets 40 containing color patches and neutral patches of known reflectances, such as the well-known Macbeth Color Checker or any other multi-color standard test target, is illuminated with an illuminant 42 and captured with both a motion picture camera 44 loaded with the desired film stock and an electronic camera 46, adjusted according to the aforementioned set-up A.

Red, green and blue film exposure values (R,G,B) can be calculated for the film in an exposure determination step 48 using a conventional film exposure calculation method, such as the following method. Computations of exposure values, from any object, depend on four factors: the spectral reflectance of the object (Reflec(λ)), the power distribution of the illuminant used (Illum(λ)), the spectral sensitivity curves of the detector capturing the scene (Sensi(λ)), and the set of optical elements used in the capture device (Optics(λ)). For the present invention, Optics(λ) is defined as the set all elements present between and including the film camera "taking" lens and Sensi(λ) refers to the film's spectral sensitivity. Exposure values are calculated according to the following equations:

$$R = \int_{\lambda-visual} Sensi_{red}(\lambda)\cdot \mathrm{Illum}(\lambda)\cdot \mathrm{Optics}(\lambda)\cdot \mathrm{Reflec}(\lambda)\,d\lambda \quad \text{Eqs.(1a, 1b, 1c)}$$

$$G = \int_{\lambda-visual} Sensi_{green}(\lambda)\cdot \mathrm{Illum}(\lambda)\cdot \mathrm{Optics}(\lambda)\cdot \mathrm{Reflec}(\lambda)\,d\lambda$$

$$B = \int_{\lambda-visual} Sensi_{blue}(\lambda)\cdot \mathrm{Illum}(\lambda)\cdot \mathrm{Optics}(\lambda)\cdot \mathrm{Reflec}(\lambda)\,d\lambda$$

The system spectral product (SSP(λ)) of a capture system is defined as:

$$\mathrm{SSP}(\lambda)=\mathrm{Sensi}(\lambda)\cdot\mathrm{Illum}(\lambda)\cdot\mathrm{Optics}(\lambda) \quad \text{Eq.(2)}$$

Where Sensi(λ) represents $Sensi_{red}$ (λ), $Sensi_{green}$ (λ), or $Sensi_{blue}$ (λ). Both the spectral power distribution of the light source and the spectral reflectance of the object can be readily measured with a spectral radiometer, a common commercially-available device. The spectral responsivities of film are published in the manufacturer's data sheets.

Now that the data from the film capture and the electronic capture is all in exposure space, a LUT may be created in a process step 16*a* that maps the digital camera's neutral scale exposure to the film's neutral scale exposure. Because electronic images are almost always captured with some type of gamma correction for later display on a monitor, as described in the aforementioned text, *Digital Color Management* by E. Giorgianni and T. Madden, the neutral patch electronic exposures are linearized in the linearization stage 15 with patch reflectances similar to film's neutral patch exposures relationship to reflectance. For example, as cited in the above-mentioned text, a typical monitor gamma is 2.22, where gamma is the exponent on the power function. Hence, a typical camera gamma (exponent on the power function) would be the inverse of the monitor gamma, 1/2.22, or 0.45. For this example, instead of directly employing the inverse power function, three one-dimensional LUTs 16 (one for each color record) are calculated for the exposure linearization stage 15 in order to apply the inverse gamma function to the electronically captured data and to account for any other electronic camera non-linearities.

In the exposure color matrix stage 17, the neutral-corrected electronic scene exposures are converted into exposure-corrected electronic scene exposures (i.e., corresponding to film exposures) by application of a matrix 18 to the neutral-corrected electronic scene exposures. This matrix 18 is calculated from the known electronic exposures by regressing the neutral-corrected electronic scene exposures in a process step 18*a* against the calculated R,G,B film exposures values. One skilled in the art of image processing should be familiar with the various regression techniques existing in packaged software, such as Mathematica or MATLAB. The technique is analogous to the matrixing techniques employed in U.S. Pat. No. 5,668,596, "Digital Imaging Device Optimized for Color Performance". This patent, which is incorporated herein by reference, demonstrates the use of a correction matrix on a video imaging system and discusses a method for minimization of the error between the set of spectral sensitivities of an imaging device, including its optical section, and the color sensitivities of the output device. This design allows a matrix (linear) operation, which is usually referred to as a color-correction matrix (CCM), to transform the "electronic camera exposure space" into another space, which in the patent is the "display monitor exposure space" but could analogously be another space such as film exposure space. The application of the LUTs 16 and matrix 18 created according to FIG. 3 provide exposure-corrected red, green and blue electronically captured exposures 50 that emulate the desired film stock's r,g,b exposures in tone and color. These exposure LUTs and matrix need to be created only once per video or digital camera set-up. If more than one scene was shot with the same electronic camera set-up, the same exposure LUT and matrix apply to all of the scenes.

In certain cases, it may be desirable for purposes of exposure accuracy to design the system such that the electronic image capture system possesses spectral product curves that can be closely approximated as a linear combination of conventional motion picture camera and film system spectral product curves. Commonly assigned co-pending U.S. Ser. No. 09/697,800, entitled "Method and Apparatus for Production of an Image Captured by an Electronic Motion Camera/Sensor that Emulates the Attributes/Exposure Content Produced by a Motion Camera Film System" and filed Oct. 27, 2000 in the names of M. Guimaraes et al, deals with just such a system. In this disclosure, an electronically originated image is converted into a modified electronic image simulating an image originated from a film system and converted into an electronically displayed image. The technique employed is based on a set of electronic camera system spectral product curves that are substantially approximated by a linear combination of a set of spectral product curves characteristic of the film system. An image is captured having red, green and blue exposure signals resulting from these electronic camera system spectral product curves, and the red, green and blue exposure signals are then converted into a modified electronic image simulating an image originated from a film system and converted into an electronically displayed image. Because of the linear approximation between the spectral product curves, the conversion step can be performed by a matrixing operation, which may be used for the matrix 18 in the present invention.

Figure 4:
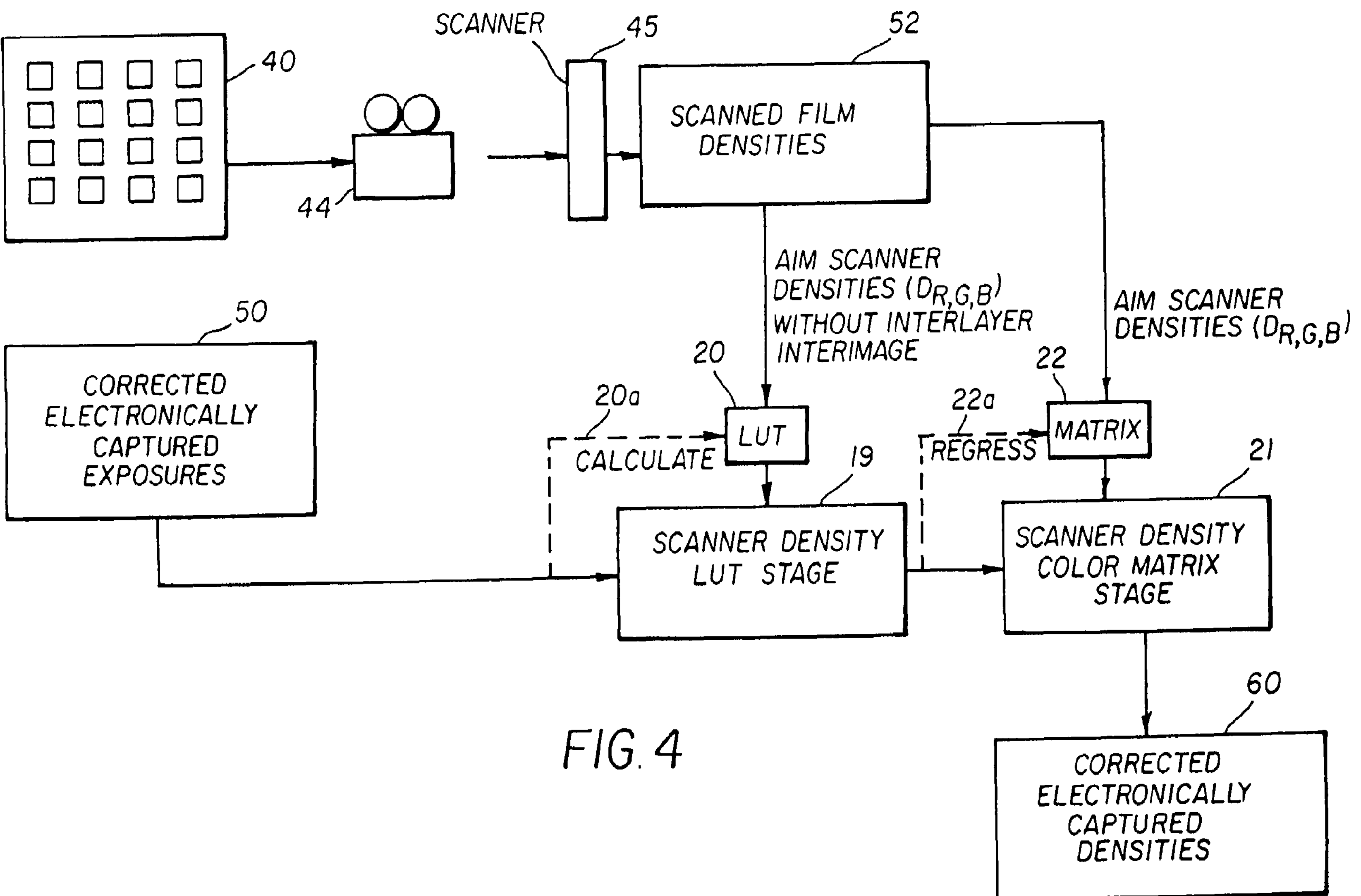
FIG. 4 is a schematic block diagram of the steps involved in the creation of density algorithms for the present invention.

FIG. 4 shows a schematic block diagram of the steps involved in creating the density algorithms used in connection with FIG. 2 for practice of the present invention. The film is processed by a film processor (not shown) and the processed film is scanned by a film scanner 45, which provides scan film density data directly related to the film printing density. The scanner densities are proportional to the logarithms of the printing exposures. Refer to the aforementioned SMPTE Tutorial by G. Kennel for a detailed description of scanner density. The exposure-corrected red, green and blue electronically captured exposures 50 that have been processed to emulate film exposures are the inputs to the scanner density stage 19 for the emulation of film tone scale, which is accomplished with nonlinear image processing, for example, with 3 one-dimensional LUTs 20. These LUTs are created using the scanned film densities 52 that were obtained by scanning the processed film images of the color chart 40 captured simultaneously with film 44 and video or digital origination. For each color record, the exposure-corrected red, green and blue electronically captured exposures 50 for the neutral patches are mapped in a process step 20*a* to the corresponding film channel-independent scanner densities. These film channel-independent scanner densities are achieved by matrixing the scanned film densities 52 with a matrix to account for interlayer interimage effects. Because of the interlayer interimage effects, the color correction appropriate for this type of system is complex, albeit well understood by those of ordinary skill in these arts. In typical photographic systems, color correction is provided by interlayer interimage effects which adjust the formation of cyan, magenta, and yellow dyes. Due to the nature of the photographic system, these interlayer interimage effects produce adjustments that are non-linearly related to the exposures recorded in the latent image. This type of color correction, which we will refer to as subtractive-type correction, is discussed in detail in such texts as *The Theory of the Photographic Process*, MacMillan Publishing Co., 1977. Interlayer interimage effects are also discussed in commonly assigned U.S. Pat. No. 5,189,511, issued in the name of K. Parulski et al and entitled "Method and Apparatus for Improving the Color Rendition of Hardcopy Images from Electronic Cameras", which is incorporated herein by reference. Thus the LUTs 20 used in the scanner density stage 19 for film tone scale emulation are created. These electronically captured "scanner densities" have now been rendered with film tone scale, resulting in the aforementioned tone-scale corrected electronic scene values.

Next the electronically captured "scanner densities", i.e., the tone-scale corrected electronic scene values, are transformed by a color correction matrix stage 21 that brings a majority of these values closer to scanned film density. Again, this matrix may be calculated in a process step 22*a* because the electronic "scanner densities", i.e., the tone-scale corrected electronic scene values, are known and can be regressed against the scanned film densities in order to generate a transformation matrix 22. These electronically captured "corrected scanner densities" 60 have now been rendered with the film color look, i.e., which emulate the film r,g,b densities in tone and color. Now these corrected scanner densities, i.e., the aforementioned color-corrected electronic scene values, of the electronically captured image may be sent to various outputs, such as the film recorder 25 or a digital projector.

Figure 5:
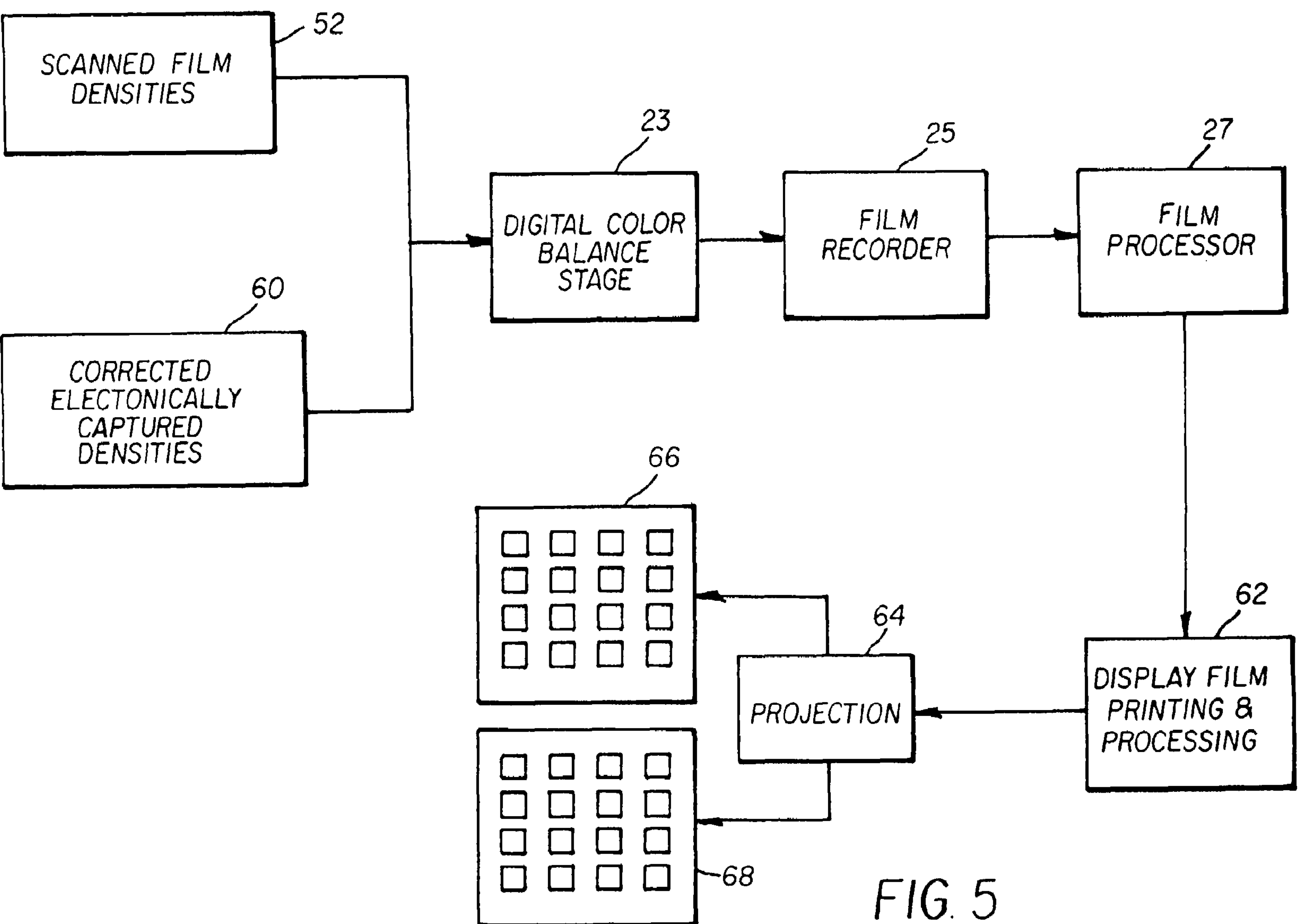
FIG. 5 is a schematic block diagram illustrating examples of the output and showing verification of the present invention.

FIG. 5 shows, for purpose of this embodiment, output and verification of the present invention. Both the scanned film densities 52 and the electronically captured "corrected scanner densities" 60 of the original scene color chart are digitally color balanced in the digital color balance stage 23, as described in connection with FIG. 2. Here a reference neutral patch is balanced to a previously determined scanner density. For comparison purposes, the scanned film density's reference neutral patch is also set to the same values. In both cases, the balance shifts required for the reference neutral patch are applied across the entire image. These balanced images are now sent, for the purpose of this embodiment, to the film recorder device 25. The film is processed in the film processor 27 according to the specifications in Eastman Kodak's H-24 Processing Manual. The output film (that film which existed in the film recorder) is then printed onto another motion picture film 62, using the standard procedures as outlined in Eastman Kodak's H-1 Professional Motion Picture Films publication. The film onto which the output film was printed (display film) is subsequently processed 62, in accordance with Eastman Kodak's H-24 Processing Manual and displayed theatrically, just as if film had been used as the originating medium. A visual comparison is made by projecting the prints side by side via a projector 64, and comparing the tone and color of the reproduced color chart that was originated on film 66 versus the reproduced color chart that was originated electronically 68.

A very good visual match can be achieved, as evidenced by the following table of colorimetric CIELAB results on some color patches as available on the Macbeth Color Checker. The present invention has the lowest average for $\Delta E^*_{94}$ on some typical color patches which can be found on the Macbeth Color Checker. Examples shown include the present invention, a method where just the neutral patches are corrected with no color correction and lastly histogram equalization. These results, pertaining to the example cited previously, were calculated according to the International Commission on Illumination (CIE) Technical Report CIE 116-1995, "Industrial Colour-Difference Evaluation".

TABLE 1

Colorimetric Results $\Delta E^*_{94}$ Data, DC versus ECN

| Name | Present Invention $\Delta E^*_{94}$ | Neutral-scale Only Corrected $\Delta E^*_{94}$ | Histogram Equalization $\Delta E^*_{94}$ |
|---|---|---|---|
| N5 neutral | 1.8 | 0.2 | 14.9 |
| Red | 5.0 | 6.4 | 15.0 |
| Green | 7.8 | 8.0 | 16.6 |
| Blue | 5.2 | 10.1 | 8.6 |
| Cyan | 4.0 | 2.9 | 12.7 |
| Magenta | 3.6 | 10.1 | 10.1 |
| Yellow | 8.6 | 4.3 | 8.1 |
| Caucasian flesh | 3.3 | 5.4 | 19.8 |
| African Am. Flesh | 2.3 | 9.1 | 14.4 |
| Average | 4.6 | 6.3 | 13.3 |

The invention has been described with reference to a preferred embodiment. However, it will be appreciated that variations and modifications can be effected by a person of ordinary skill in the art without departing from the scope of the invention. For instance, regraining algorithms, such as those found in U.S. Pat. No. 5,641,596, as well as other image structure algorithms, such as blurring or sharpening techniques, could readily be performed on the electronic image files in conjunction with the present invention.

PARTS LIST

1 frame of digital image
2 scanned frame of reference film
3 resizing constraints
4 cumulative histogram equalization process
5 output manipulated images
10 talent close up scene
11 background scene
12 action scene
14 capture stage
15 exposure linearization stage
16 first LUT
16*a* process step
17 exposure color matrixing stage
18 first matrix
18*a* process step
19 scanner density stage
20 second LUT
20*a* process step
21 scanner density color matrix stage
22 second matrix
22*a* process step
23 digital color balance stage
25 film recorder
27 film processor
30 first film
31 second film
32 third film
40 color chart
42 illuminant
44 motion picture camera
45 scanner
46 electronic camera
48 exposure determination process
50 corrected electronically captured exposures
52 scanned film densities
60 corrected electronically captured densities
62 print and process stage
64 projector
66 reproduced color chart, film originated
68 reproduced color chart, electronic originated

What is claimed is:

1. A method for converting a sequence of electronically captured images into a sequence of modified images for providing the appearance of images captured by a film reproduction system, the film reproduction system being of the type that includes motion picture negative film printed onto a motion picture print film that is displayed, or a reversal motion picture system in which the reversal film is displayed, or a motion picture film electro-optically scanned to standard format video by a telecine and further displayed, or a motion picture film electro-optically scanned by a scanner suitable for producing digital data intended for additional digital image manipulation, further prepared as a digital master for electronic distribution or recorded out to another film to be used as a printing master for producing distribution optical prints for theatrical projection, said method comprising the steps of:

(a) electronically capturing a sequence of images, resulting in linearized neutral-corrected electronically captured image data;

(b) transforming the neutral-corrected electronically captured images with a non-linear function that renders the neutral-corrected electronically captured images with a tone scale of the film reproduction system, resulting in tonescale-corrected electronically captured images;

(c) transforming the tonescale-corrected electronically captured images with a linear function that emulates a film color look provided by the film reproduction system, resulting in modified images that provide the appearance of an image captured with the film reproduction system, wherein the transformation steps are referenced to scanned film densities of a film used in the film reproduction system;

(d) color balancing the modified images representative of scanned film densities before subsequent utilization by balancing a reference neutral to a predetermined scanner density, resulting in modified images; and (e) transforming color-balanced modified images to standard format video signals suitable for television.

2. The method as claimed in claim 1 further comprising the step of transforming video signals for recording on film.

3. The method as claimed in claim 1 further comprising the step of transforming video signals for display.

4. The method as claimed in claim 3, wherein the display is selected from the group consisting of (a) an electro-optical display including at least one of a digital projector, a television display, a video projector, a liquid crystal display or a laser projector; (b) retinal projection and (c) an electro-optic mechanism.

5. A method for converting a sequence of electronically captured images into a sequence of modified images for providing the appearance of images captured by a film reproduction system, the film reproduction system being of the type that includes a motion picture negative film printed onto a motion picture print film that is displayed, or a reversal motion picture system in which a reversal film is displayed, or a traditional motion picture film electro-optically scanned to standard format video by a telecine and further displayed, or a motion picture film electro-optically scanned by a scanner suitable for producing digital data intended for additional digital image manipulation, further prepared as a digital master for electronic distribution or recorded out to another film to be used as a printing master for producing distribution optical prints for theatrical projection, said method includes a lookup table that represents any transforming step or subsequent transforming step, either as a single step or as a combination of consecutive steps comprising of:

(a) transforming electronically captured image data into linearized exposure data, resulting in neutral-corrected electronically captured images;

(b) transforming the neutral-corrected electronically captured images with a linear function that emulates a film exposure of the film reproduction system, resulting in exposure-corrected electronically captured images;

(c) transforming the exposure-corrected electronically captured images with a non-linear function that renders the neutral-corrected electronically captured images with a tone scale of the film reproduction system, resulting in tonescale-corrected electronically captured images;

(d) transforming the tonescale-corrected electronically captured images with a linear function that emulates a film color look provided by the film reproduction system, resulting in modified images that provide the appearance of an image captured with the film reproduction system, wherein the transformation steps are referenced to scanned film densities of a film used in the film reproduction system;

(e) color balancing the modified images representative of scanned film densities before subsequent utilization by balancing a reference neutral to a predetermined scanner density, resulting in modified images;

(f) transforming color-balanced modified images for recording on film;

(g) transforming color-balanced modified images to standard format video signals suitable for television;

(h) transforming video signals for recording on film; and (i) transforming video signals for display.

* * * * *